United States Patent [19]

Carmichael et al.

[11] Patent Number: 4,571,007
[45] Date of Patent: Feb. 18, 1986

[54] PROPORTIONING RELAY VALVE

[75] Inventors: Richard W. Carmichael, Parma; John G. Nosse, Grafton, both of Ohio

[73] Assignee: Allied Corporation, Morristown, N.J.

[21] Appl. No.: 608,687

[22] Filed: May 10, 1984

[51] Int. Cl.⁴ .............................................. B60T 11/12
[52] U.S. Cl. .................................... 303/7; 303/6 C; 303/40
[58] Field of Search .................... 303/6 C, 6 R, 7, 13, 303/40

[56] References Cited

U.S. PATENT DOCUMENTS

| 4,230,373 | 10/1980 | Plantan | 303/7 |
| 4,261,624 | 4/1981 | Plantan | 303/7 |
| 4,348,062 | 9/1982 | Koenig | 303/6 C |
| 4,368,926 | 1/1983 | Bartholomew | 303/7 |
| 4,455,051 | 6/1984 | Falk | 303/7 X |

Primary Examiner—Duane A. Reger

Attorney, Agent, or Firm—Ken C. Decker; William N. Antonis

[57] ABSTRACT

A proportioning relay valve (10) includes a housing (12) receiving a relay piston (28) which controls communication between supply (14), exhaust (18) and delivery or outlet (16) ports. Control pressure is communicated to the relay piston (28) through a proportioning piston (58). The proportioning piston (58) is controlled by the pressure level at the actuating pressure port (22) to proportion communication to the relay piston (28) when the pressure level at actuating pressure port (22) is low and to permit unproportioned communication to the relay piston (28) when the pressure at actuating pressure port (22) is high. A bypass passage (80) and relief valve (86) also control the proportioning piston (58) so that unproportioned communication to relay piston (28) is permitted regardless of the pressure level at the actuating pressure port (22) when pressure at the control port (20) exceeds a predetermined value.

9 Claims, 1 Drawing Figure

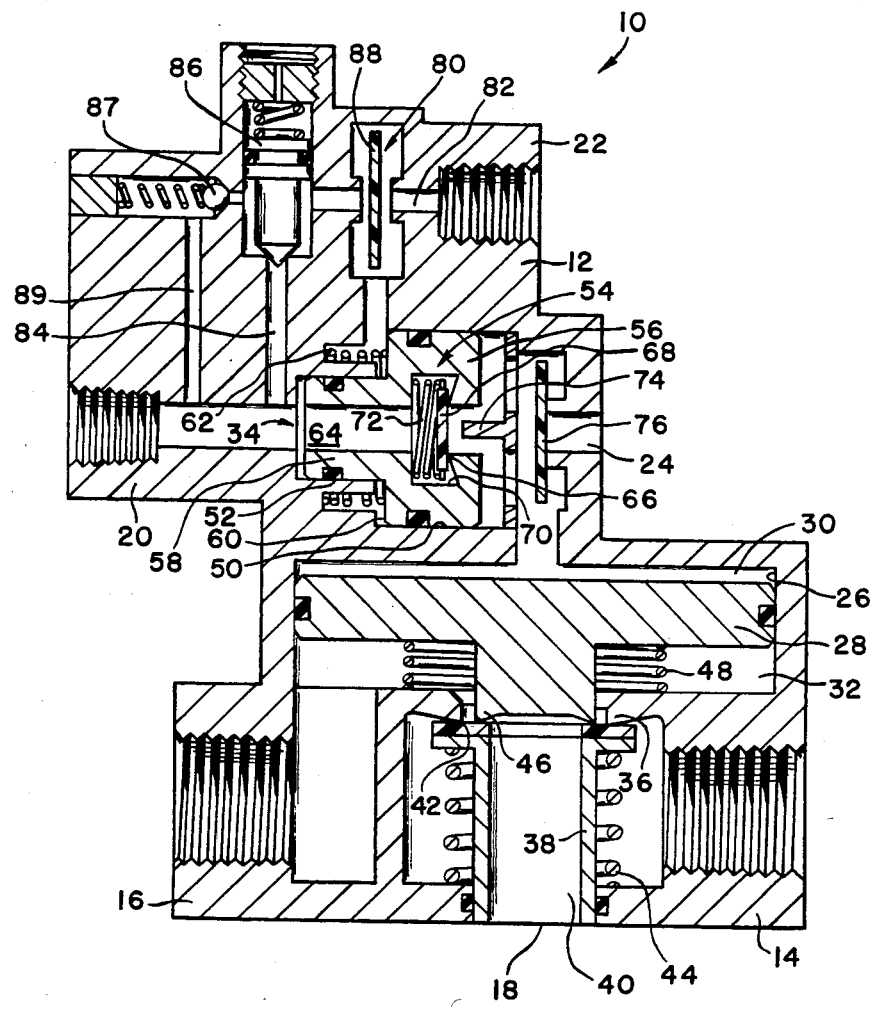

PROPORTIONING RELAY VALVE

This invention relates to a proportioning relay valve for a fluid pressure braking system.

Heavy duty articulated vehicles, comprising a towed unit or semi-trailer and a towing unit or tractor, are in common use. The vehicle is normally operated when both portions of the vehicle are connected together. However, there are situations when the tractor portion of the vehicle must be operated in the so-called "bobtail" mode, i.e., operated without a semi-trailer. Naturally, the rear wheel brakes of the tractor must be sized to accommodate the weight of a loaded vehicle. This presents a problem when the vehicle is operated in the bobtail mode, because the brakes on the rear wheels of the tractor are then greatly oversized and are quite dangerous, since they tend to lock up quickly during a brake application. This obviously results in a very dangerous situation, particularly on wet or slippery surfaces. However, even when the tractor is operated in the bobtail mode, it may be necessary, under emergency conditions, to make a full application of the rear wheel brakes, particularly if the braking circuit actuating the front wheel brakes of the vehicle has failed.

Prior art solutions to this problem are described in U.S. Pat. Nos. 4,261,624; 4,348,062; 4,230,373; and 4,368,926. The systems proposed in all of these patents are generally quite complicated and relatively expensive. Furthermore, they generally either do not provide any mechanism for overriding the proportioning effect during emergency situations, or the emergency override is very complicated. Accordingly, the present invention solves the problem of the oversized brakes on tractors operated in the bobtail mode by providing a relatively simple and inexpensive additional component on the standard relay valve which controls fluid pressure communication to the rear wheel brakes of the tractor, and which also includes a by-pass and relief valve to overcome the proportioning effect when the vehicle operator effects a high-pressure brake application.

Other features and advantages of the invention will become apparent from the following description with reference to the accompanying drawings, the sole FIGURE of which is a cross-sectional view of a proportioning relay valve made pursuant to the teachings of our present invention.

Referring now to the drawings, a proportioning relay valve generally indicated by the numeral 10 includes a housing 12 having an inlet or supply port 14, an outlet or delivery port 16, an exhaust port 18, a control port 20, an actuating pressure port 22, and another exhaust port 24. The supply or inlet port 14 is communicated to a standard air reservoir which is charged in the conventional manner by the vehicle automotive air compressor. The outlet or delivery port 16 is communicated to the rear wheel brake actuators of the tractor on which the valve 10 is mounted. The control port 20 is communicated to the outlet port of the conventional operator-actuated brake valve, and receives a pressure signal from the brake valve whenever the vehicle operator actuates the brakes of the vehicle. The actuating pressure port 22 is communicated to the outlet of the conventional tractor protection valve (not shown) which provides the interface between the braking system of the tractor and the braking system of the trailer. The outlet of the tractor protection valve will be at substantially atmospheric pressure when the tractor is operated in the bobtail mode, and will be at some predetermined high pressure level when the tractor is connected to the trailer. Of course, the exhaust ports 18 and 24 communicate with atmospheric pressure.

The housing 12 defines a chamber 26 therewithin which slidably receives a relay piston generally indicated by the numeral 28, which divides the chamber 26 into portions 30 and 32. The supply port 14, delivery port 16 and exhaust port 18 communicate with portion 32 of the chamber 26. The portion 30 of the chamber 26 is communicated with the control port 20 through a passage generally indicated by the numeral 34. A circumferentially extending valve seating area 36 circumscribes the portion 32 of the chamber 26 and defines a passage through which pressure communicated to the supply port 14 can be communicated into the portion 32. The delivery port 16 communicates with the portion 32 of chamber 26 at all times. A combination inlet and exhaust valve 38 is slidably mounted in the exhaust port 18 and defines a passage 40 therewithin that can be adapted to communicate the portion 32 of chamber 26 with the exhaust port 18. A portion 42 of the inlet/exhaust valve 38 is urged into sealing engagement with the circumferentially extending valve seating area 36 by a spring 44. A circumferentially extending lip 46 is carried by the relay piston 28 which is also adapted to engage the portion 42 of the inlet/exhaust valve 38 as will be more fully described hereinafter. A spring 48 in the portion 32 of chamber 26 yieldably urges the relay piston 28 upwardly viewing the drawing.

Passage 34 which communicates the control port 20 with the portion 30 of the chamber 26 includes a stepped section comprising a larger diameter portion 50 and a smaller diameter portion 52. A stepped proportioning piston generally indicated by the numeral 54 includes a larger diameter portion 56 which is slidably received in the larger diameter portion 50 of the passage 34. Piston 54 further includes a smaller diameter portion 58 which is slidably received in the smaller portion 52 of the passage 34. The larger and smaller diameter portions of the piston 54 define a shoulder at their juncture, which cooperates with a corresponding shoulder on the passage 34 to define a pressure cavity 60 therebetween. A spring 62 is disposed in the cavity 60 and bears against the shoulder on the piston 54 to urge the latter to the right viewing the drawing.

The piston 54 defines a bore 64 extending therethrough. A circumferentially extending valve seat 66 is carried by the piston 54 and circumscribes the bore 64. A valve member 68 is slidably mounted in enlarged portion 70 of the bore 64 and is urged into sealing engagement with the valve seat 66 by a spring 72. A projection 74 is rigidly mounted in the larger portion 50 of the passage 34 and is adapted to engage the valve member 68 to urge the latter out of sealing engagement with the valve seat 66 when the piston 54 is urged to the right viewing the drawing. A check valve 76 is disposed in the passage 34 between the projection 74 and the exhaust port 24, and normally sealingly engages the latter to prevent communication therethrough. However, when the pressure level at the control port 20 drops below the pressure level in the portion 30 of chamber 26, the check valve 76 is urged away from the exhaust port 24 by the higher pressure in portion 30 of chamber 26 to permit the venting of the pressure level in the portion 30 of chamber 26.

Still another passage generally indicated by the numeral 80 communicates with the pressure cavity 60. Passage 80 includes a first branch 82 which communicates with the actuating pressure port 22 and a second branch 84 which communicates with the control port 20. A relief valve generally indicated by the numeral 86 normally closes communication through the branch 84, but the relief valve 86 opens when the pressure level of the control port 20 exceeds a predetermined level. A check valve 87 controls communication in bypass passage 89 to vent the pressure in passage 80 when pressure at control port 20 drops when the brakes are released. A check valve 88 is also located in the passage 80 and is responsive to the pressure differential between the branches 82, 84 to communicate only the higher of the pressure levels in the branches 82 or 84 to the pressure cavity 60.

In operation, when the braking systems of the tractor and trailer are connected together, the pressure level of the aforementioned tractor protection valve (not shown) remains at a predetermined high level. Accordingly, this pressure level is communicated to the actuating pressure port 22 and through the passage 80 to the pressure cavity 60, so that the pressure at port 22 acts on the shoulder on piston 54 to urge the latter to the right viewing the drawing. Accordingly, the projection 74 urges the valve member 68 away from the valve seat 66 to permit substantially uninhibited communication into the portion 30 of chamber 26. The aforementioned brake valve communicates a pressure signal to the control port 20, when a brake application is effected, which is communicated directly into portion 30 of chamber 26, since the proportioning piston 54 is being held in the position wherein the projection 74 maintains the valve member 68 open. Accordingly, pressure in the portion 30 urges the relay piston 28 downward to first cause the lip 46 to sealingly engage the inlet/exhaust valve 38 to thereby terminate communication between the delivery or outlet port 16 and the exhaust port 18, and to thereafter urge the inlet/exhaust valve 38 downwardly viewing the FIGURE to crack open the portion 42 from the valve seating area 36 to permit communication from the inlet or supply port 14 to the delivery port 16. When the vehicle operator releases the brake valve, the pressure level at control port 20 drops, causing the check valve 76 to open to communicate the portion 30 with exhaust port 24, thereby venting the portion 30 to permit the spring 48 to urge the relay piston 28 upwardly viewing the FIGURE, thereby terminating communication between the ports 14 and 16 and venting the port 16 to the exhaust port 18.

Assuming now that the tractor is being operated in the bobtail mode, the outlet of the aforementioned tractor protection valve (not shown) will be vented to atmosphere, thereby also venting the actuating pressure port 22 to atmosphere and causing the pressure cavity 60 to also be vented. Nevertheless, the piston 54 will be urged to the right by the spring 62 to hold the valve member 68 open, but only a portion of any pressure level at the control port 20 will be communicated into the passage 34 downstream of the piston 54, because of the differential areas across the piston. The ratio of the pressures across the piston will be a function of the diameters of the smaller and larger diameter portions of the piston and the force of the spring 62, as is well known to those skilled in the art. Accordingly, the pressure level communicated to the rear wheel brakes of the tractor will be a predetermined proportion of the pressure level communicated to the rear wheel brakes when a trailer is attached to the tractor. Accordingly, due to the reduced pressure, the tendency of the rear wheel brakes to lock and cause a dangerous skid is reduced.

However, it is necessary to provide for a full brake application, even when the vehicle is operated in the bobtail mode as described above. This is necessary, for example, during a failure of the braking circuit controlling the front wheel brakes of the vehicle. In this condition, since the front wheel brakes have failed, it is obviously necessary that the rear wheel brakes be applied to their fullest possible extent. Accordingly, when this occurs, the vehicle operator instinctively presses down on the brake pedal to communicate a very high pressure level to the control port 20. This very high pressure level is sufficient to open the relief valve 86 and thereby cause a portion of the pressure communicated to the control port 20 to communicate through the passage 80 into the pressure cavity 60, where it acts upon the piston 54 to hold the latter in its rightwardmost postion viewing the drawings. Accordingly, when the very high pressure brake application is communicated to the pressure control port 20 when the vehicle is being operated in the bobtail mode, the same pressure level is commuted into the pressure cavity 60 as would be communicated thereto by the pressure communicated through the actuating pressure port 22 when the vehicle is operated with the trailer attached. Accordingly, since the piston 54 is held in its rightwardmost position, its proportioning effect is overcome, to permit a full brake application to be effected.

We claim:

1. Proportioning control valve for a fluid pressure braking system comprising a housing, an inlet port, an outlet port, a control port, and an actuating pressure port carried by said housing, valve means in said housing for controlling communication between the inlet and outlet ports, means for operating said valve means for establishing a pressure level at said outlet port as a function of the pressure level at the control port, said operating means including proportioning means shiftable from a first condition wherein the operating means carries said valve means to establish a pressure level at the outlet port as a first function of the pressure level at the control port to a second conditon wherein said valve means establishes a pressure level at said outlet port as a second function of the pressure level at said control port, said proportioning means being responsive to the pressure level at said actuating pressure port to shift said proportioning means between the first and second conditions, and means responsive to a predetermined pressure level at said inlet port for overriding the pressure level at the actuating pressure port to cause said proportioning means to shift to said first condition regardless of the pressure level at the actuating pressure port.

2. Proportioning control valve as claimed in claim 1, wherein one side of said proportioning means is communicated to said control port, said operating means including means for controlling said valve means, the other side of said proportioning means communicating with said controlling means, said proportioning means in said first condition establishing substantially equal pressures on the sides of said proportioning means and in said second condition establishing a pressure on said other side of said proportioning means lower than the pressure level at the inlet.

3. Proportioning control valve as claimed in claim 2, wherein said proportioning means has a control surface responsive to fluid pressure to shift said proportioning means to the second condition, and relief valve means communicated to said control surface and to said inlet port for communicating a pressure level to said control surface shifting the proportioning means to the first condition when the pressure level at the inlet port attains a predetermined level.

4. Proportioning control valve as claimed in claim 3, wherein said housing includes passage means communicating said relief valve means with said control surface, said actuating pressure port being communicated with said passage means, and check valve means in said passage means for communicating the higher of the pressure levels at said actuating pressure port and the relief valve means to said control surface.

5. Proportioning control valve as claimed in claim 4, wherein said proportioning means includes a differential area piston slidably mounted in said housing, said piston having a larger area exposed to the pressure level at the valve operating means and a smaller area exposed to the pressure level at the control port and being effective to establish a pressure level across the piston in proportion to the ratio between said areas, said larger and smaller areas of the piston being joined to define a shoulder therebetween, said shoulder defining said control surface.

6. Proportioning control valve for a fluid pressure braking system comprising a housing, said housing having an inlet port and an outlet port, valve means carried by said housing for controlling communication between the inlet and outlet ports, a relay piston slidably mounted in said housing for operating said valve members, a control port on said housing for communicating control air to said relay piston to thereby cause said relay piston to establish a pressure level at said outlet port as a function of the pressure level communicated to said relay piston, proportioning means controlling communication between said control port and said relay piston, said proportioning means being shiftable from a first condition permitting substantially uninhibited communication from the control port to the relay piston to a second condition proportioning communication to said relay piston to thereby establish a pressure level at the latter proportionally less than the pressure level at said control port, and an actuating pressure port carried by said housing, said proportioning means including proportioning control means responsive to the pressure level at the actuating port to shift between said first and second conditions.

7. Proportioning control valve as claimed in claim 6, and relief valve means responsive to the pressure level at the inlet port and communicated to said proportioning control means for maintaining the proportioning means in the first condition regardless of the pressure level at said actuating pressure port when the pressure level at the control port exceeds a predetermined level.

8. Proportioning control valve as claimed in claim 7, wherein said housing includes passage means communicating said actuating port and said relief valve means with said proportioning control means, and check valve means in said passage means for communicating the higher of the pressure levels at said relief valve means and said actuating port to said proportioning control means.

9. Proportioning control valve as claimed in claim 8, wherein said proportioning means is a differential area piston having larger and smaller areas communicating respectively with the relay piston and the control port, said larger and smaller areas joining to define a shoulder, said proportioning control means being a fluid pressure responsive surface on said shoulder.

* * * * *